Figure 4:
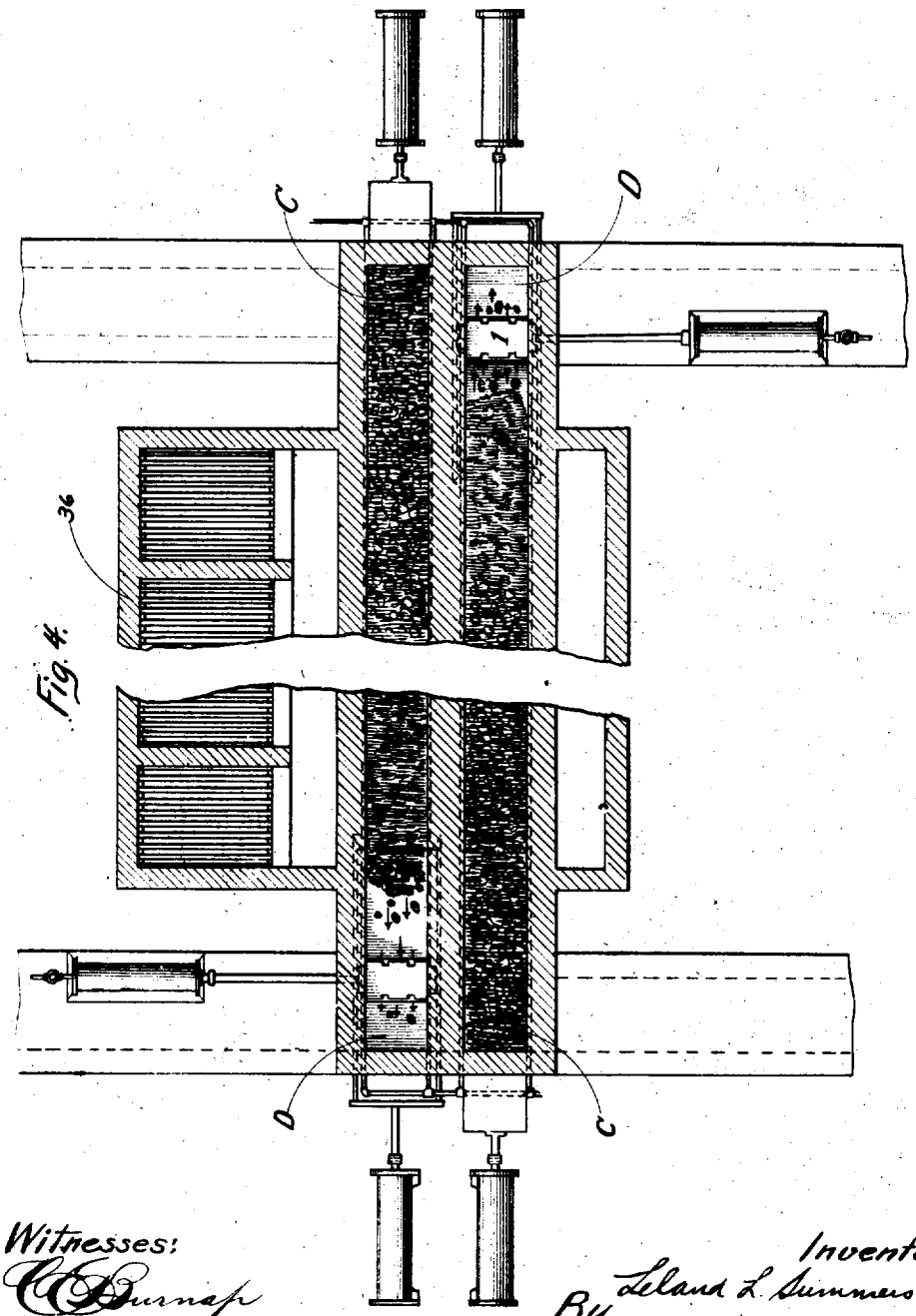

L. L. SUMMERS.
COKING FURNACE AND CONVEYER THEREFOR.
APPLICATION FILED MAR. 25, 1909.
Reissued Nov. 7, 1911. APPLICATION FILED OCT. 4, 1911. 7 SHEETS—SHEET 1.
13,311.
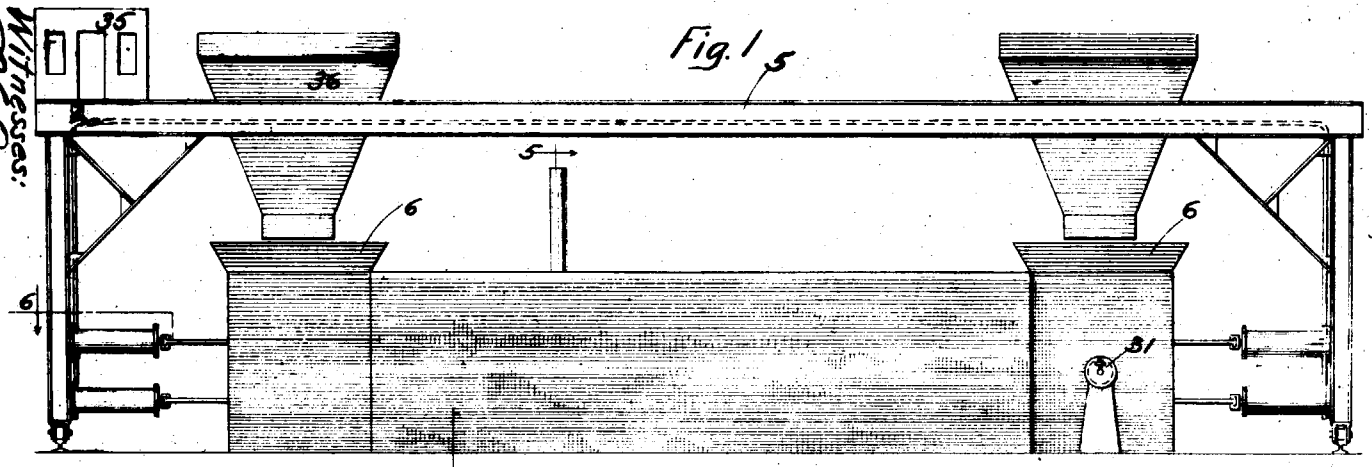
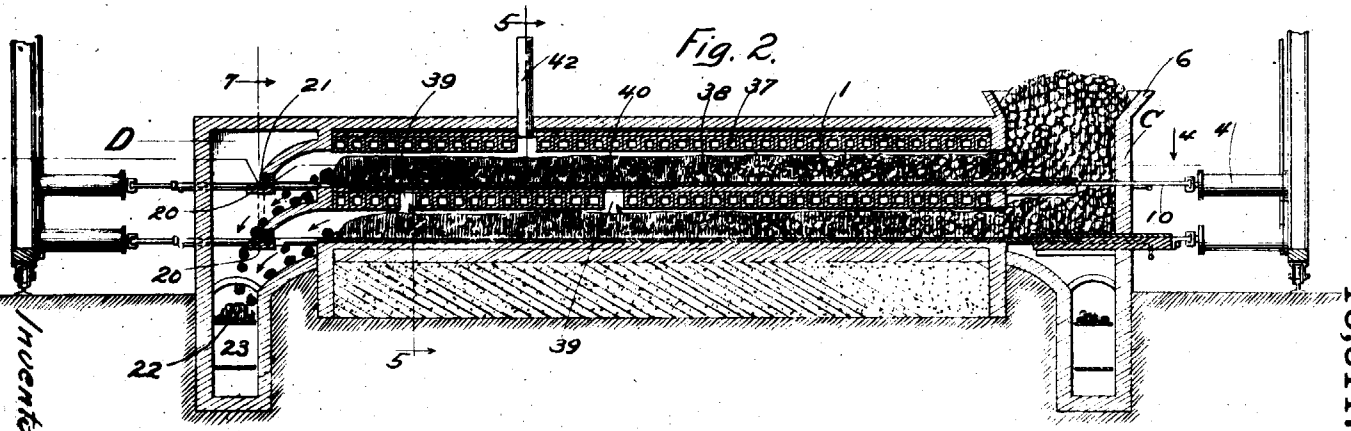
Witnesses:
C. E. Burnop
Henry A. Parks
Inventor
Leland L. Summers
By Sheridan, Wilkinson & Stott
Attys.

L. L. SUMMERS.
COKING FURNACE AND CONVEYER THEREFOR.
APPLICATION FILED MAR. 25, 1909
APPLICATION FILED OCT. 4, 1911.
Reissued Nov. 7, 1911.
7 SHEETS-SHEET 3.
13,311.
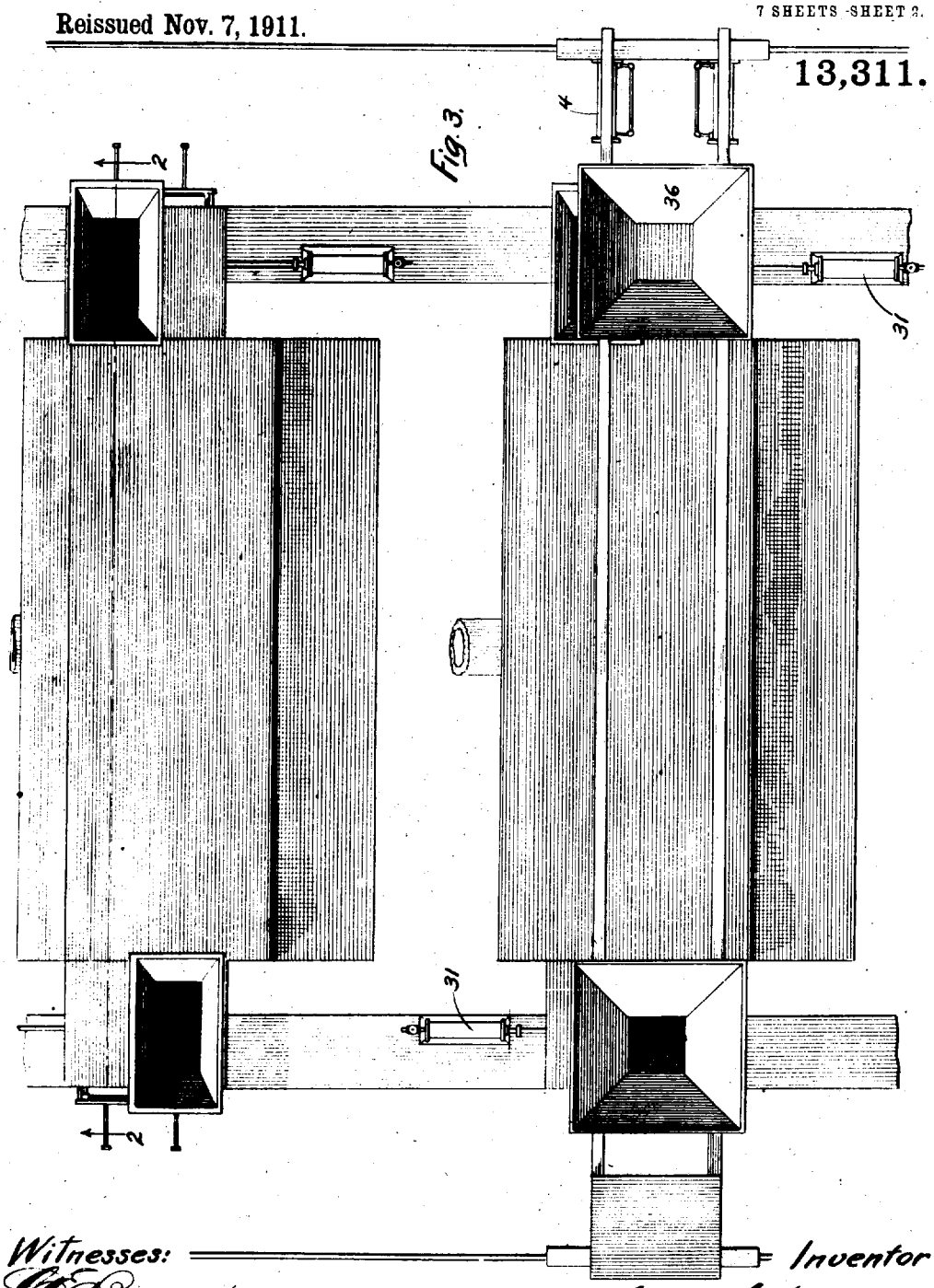
Witnesses:
C. E. Burnap
Henry A. Parks
Inventor
Leland L. Summers
By Sheridan, Wilkinson & Hoff
Atty's

L. L. SUMMERS.

COKING FURNACE AND CONVEYER THEREFOR.

APPLICATION FILED MAR. 25, 1909

APPLICATION FILED OCT. 4, 1911

7 SHEETS—SHEET 3.

Reissued Nov. 7, 1911.

13,311.

Witnesses:
C. E. Burnap
Henry A. Parke

Inventor
Leland L. Summers
By Sheridan, Wilkinson & Stott
Attys

L. L. SUMMERS.

COKING FURNACE AND CONVEYER THEREFOR.

APPLICATION FILED MAR. 25, 1909.

Reissued Nov. 7, 1911. APPLICATION FILED OCT. 4, 1911. 7 SHEETS—SHEET 4.

13,311.

Witnesses:
C. C. Burnap
Henry A. Parke

Inventor
Leland L. Summers
By Sheridan, Wilkinson & Scott
Att'ys

L. L. SUMMERS.
COKING FURNACE AND CONVEYER THEREFOR.
APPLICATION FILED MAR. 25, 1909.
APPLICATION FILED OCT. 4, 1911. 7 SHEETS—SHEET 5.
Reissued Nov. 7, 1911. 13,311.
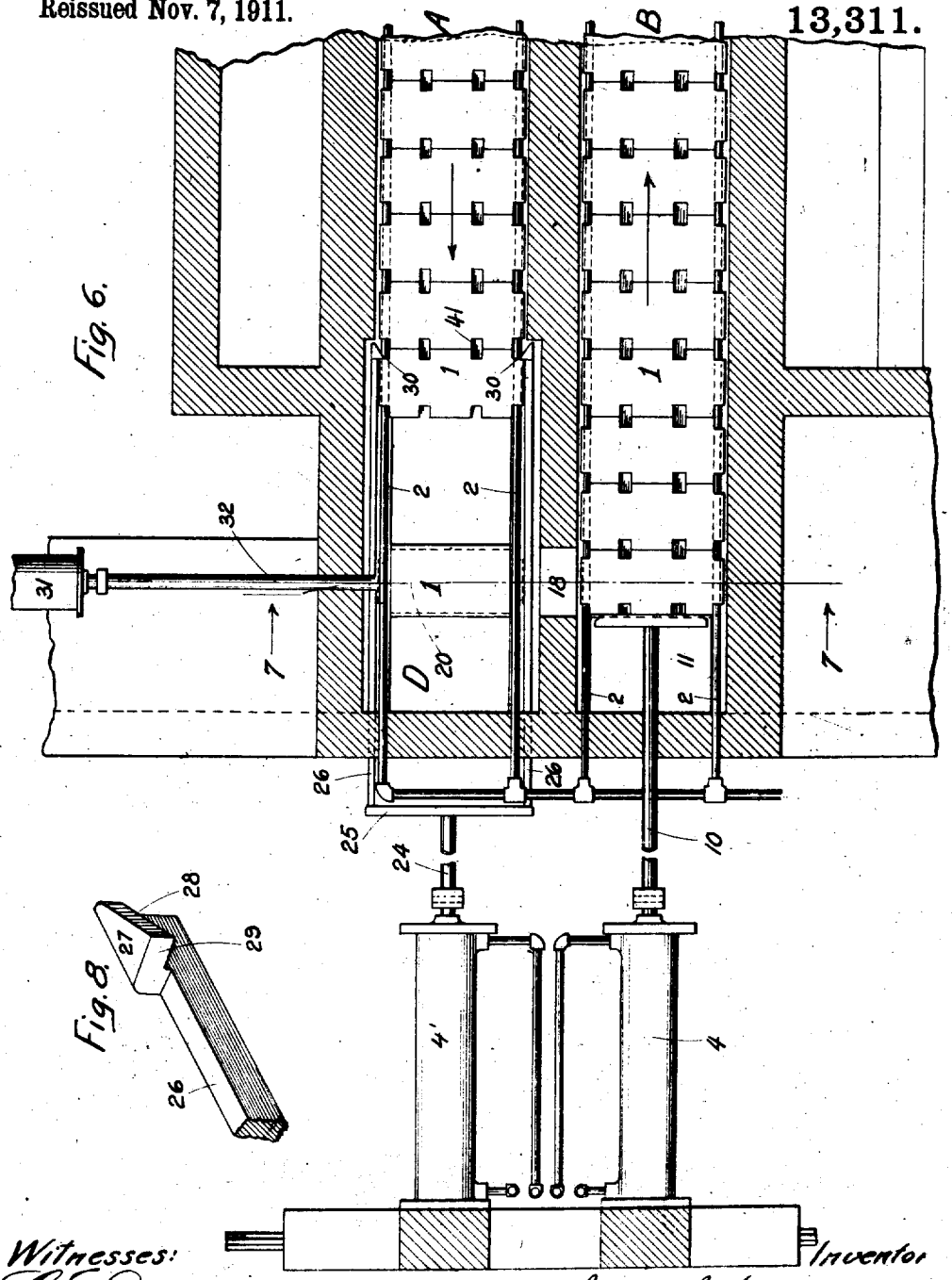
Witnesses:
C. E. Burnap
Henry A. Parks
Inventor
Leland L. Summers
By Sheridan, Wilkinson & Stott
Attys

L. L. SUMMERS.

COKING FURNACE AND CONVEYER THEREFOR.

APPLICATION FILED MAR. 25, 1909.

APPLICATION FILED OCT. 4, 1911.

Reissued Nov. 7, 1911.

7 SHEETS—SHEET 6.

13,311.

Witnesses:

C. E. Burnap

Henry A. Parks

Inventor

Leland L. Summers

By Sheridan, Wilkinson & Scott Atty's

L. L. SUMMERS.
COKING FURNACE AND CONVEYER THEREFOR.
APPLICATION FILED MAR. 25, 1909.
7 SHEETS—SHEET 7.
APPLICATION FILED OCT. 4, 1911.
Reissued Nov. 7, 1911.
13,311.
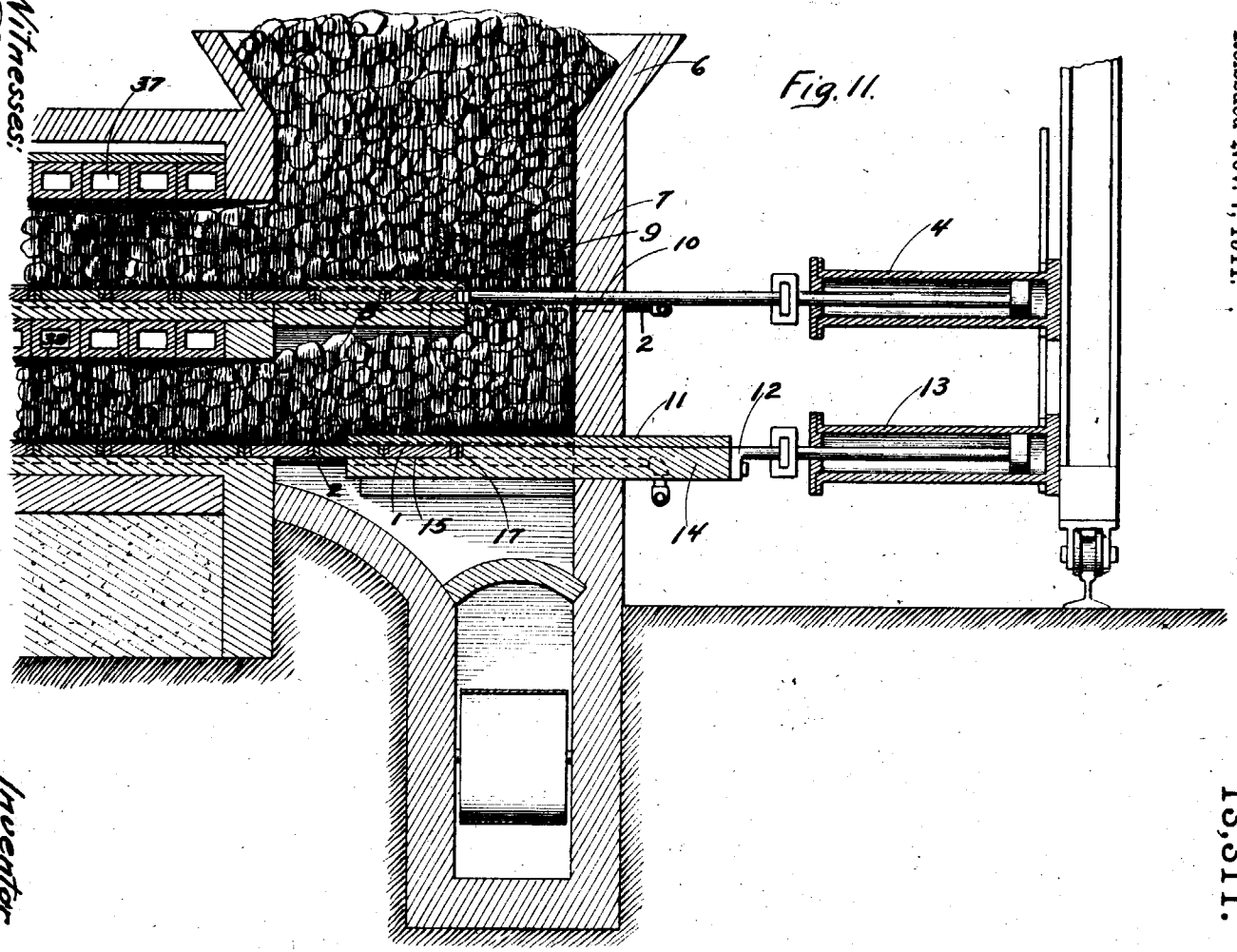
Witnesses:
C. E. Burnap
Henry A. Parke
Inventor
Leland L. Summers
By Sheridan, Wilkinson & Scott
Attys

UNITED STATES PATENT OFFICE.

LELAND L. SUMMERS, OF CHICAGO, ILLINOIS, ASSIGNOR TO CONTINUOUS PROCESS COKE COMPANY, OF CHICAGO, ILLINOIS, A CORPORATION OF MAINE.

COKING-FURNACE AND CONVEYER THERFFOR.

13,311. Specification of Reissued Letters Patent. Reissued Nov. 7, 1911.

Original No. 1,003,544, dated September 19, 1911, Serial No. 485,594. Application for reissue filed October 4, 1911. Serial No. 652,988.

*To all whom it may concern:*

Be it known that I, LELAND L. SUMMERS, a citizen of the United States, residing at Chicago, in the county of Cook and State of Illinois, have invented certain new and useful Improvements in Coking-Furnaces and Conveyers Therefor, of which the following is a specification.

The object of my invention is to provide a coking oven in which a continuous coking process may be conducted, and relates more particularly to the means for conveying the material through the retorts, and the means for applying power to the conveyers of a series or battery of retorts.

Other objects and advantages of my improved furnace will appear from the following description and claims, taken in connection with the accompanying drawings, in which—

Figure 1A:
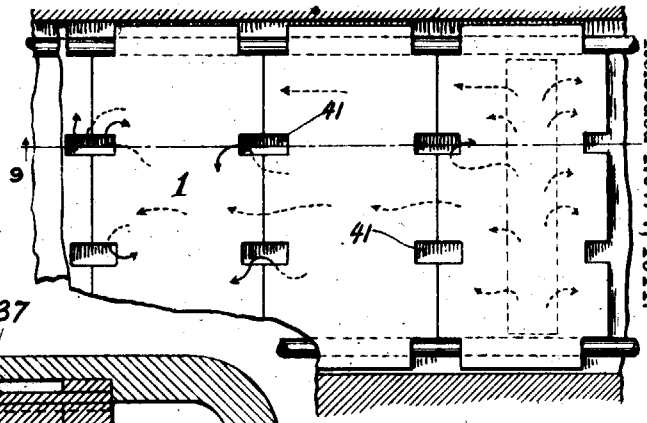
Figure 5:
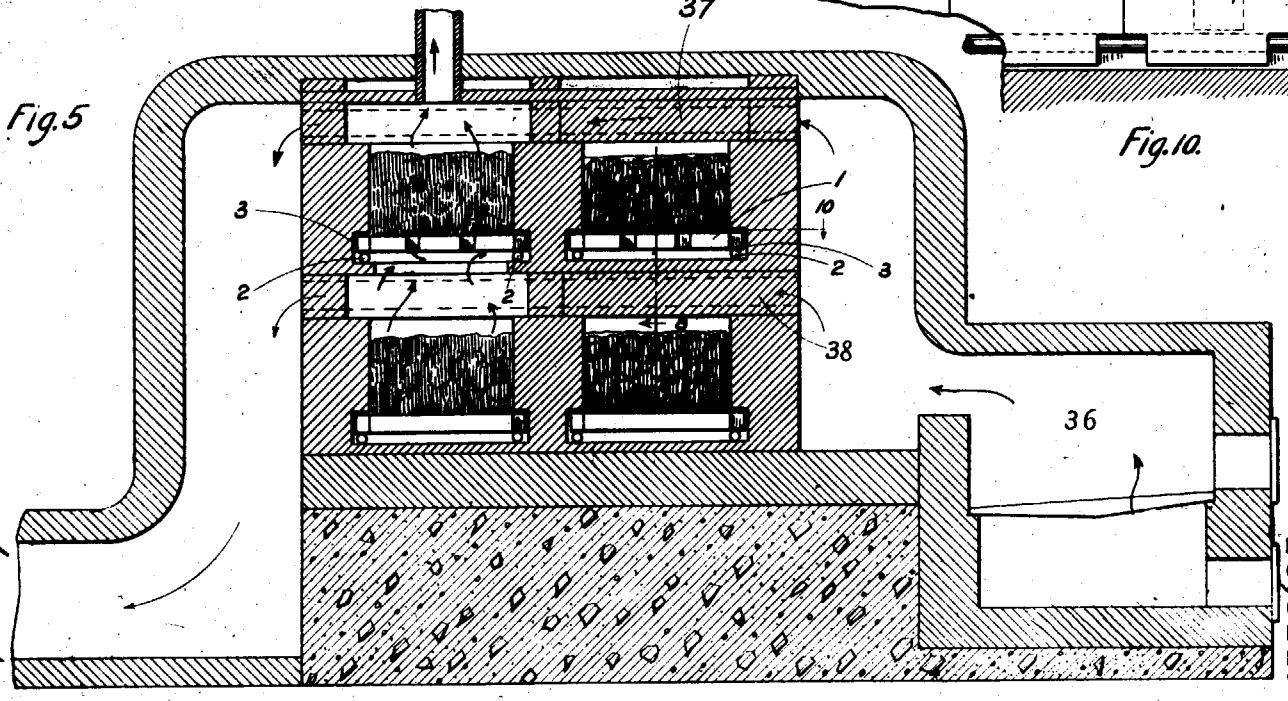
Figure 9:
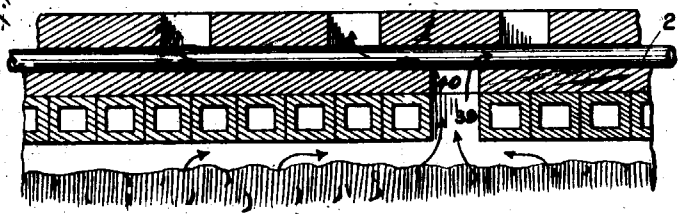
Figure 7:
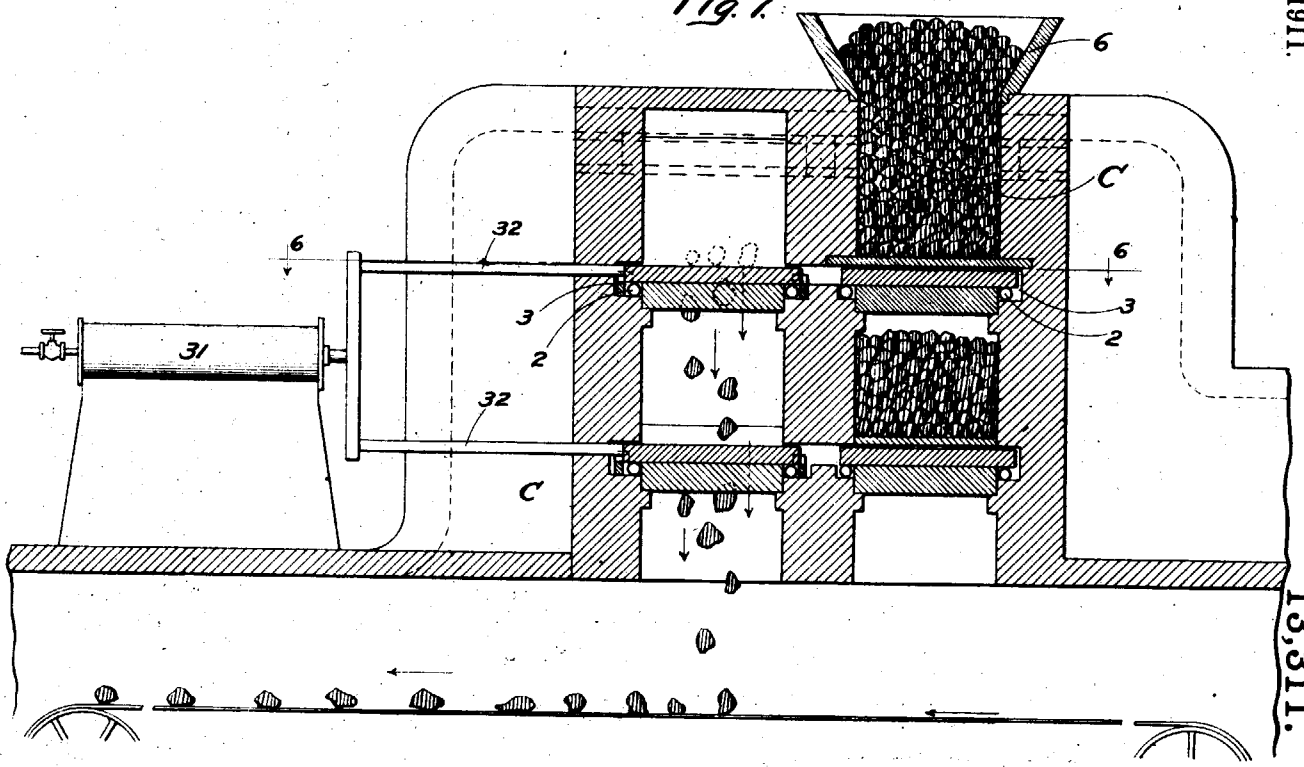

Figure 1 is a side elevation of a furnace constructed according to my invention. Fig. 2 is a longitudinal vertical section on the line 2 of Fig. 3. Fig. 3 is a plan view. Fig. 4 is a horizontal section on the line 4 of Fig. 2. Fig. 5 is a transverse section on the line 5 of Fig. 2. Fig. 6 is a horizontal section of one end of the furnace on the line 6 of Fig. 7, the furnace being shown empty. Fig. 7 is a transverse section on the line 7 of Figs. 2 and 6. Fig. 8 is a detail of one end of the gripping rods. Fig. 9 is a fragmentary vertical section on the line 9 of Fig. 10. Fig. 10 is a fragmentary plan view of the conveyer and contiguous part of the retort. Fig. 11 is an enlarged detail vertical section corresponding to the right-hand end of Fig. 2.

In the improved furnace illustrated, the retorts are arranged in horizontal pairs with a continuous conveyer operating in a continuous circuit therethrough. As illustrated, the retorts are also arranged in vertical pairs with common feeding and discharge chambers at their opposite ends. The arrangement of the continuous conveyer mechanism, however, is independent of the arrangement of the retorts in vertical pairs with common feeding and discharge chambers, and the two features may be utilized separately or together, as desired. When used together, however, economies are secured in the heating of the retorts and in the actuation of the conveyer mechanism.

In the present instance I have shown eight retorts arranged in two furnaces side by side with common actuating mechanism for the conveyers mounted upon a crane which spans the furnaces and is adapted to move from one to the other as occasion requires in the feeding of the material through the retorts. The crane also carries hoppers coacting with hoppers upon the furnaces for the purpose of delivering coal thereto.

The conveyer mechanism comprises a series of disconnected elements 1, preferably taking the form of fire-brick tiles and lying side by side in the retorts and forming a movable floor therein. In order to facilitate the movement of the conveyer elements 1 through the retorts, I provide rails 2 which, preferably, consist of water-cooled pipes seated at the base of undercut recesses 3 in the side walls of the retort. The tiles 1 are of greater width than the main portion of the retort and project into the recesses 3, where they rest upon the rails 2. The tiles 1 are pushed through each retort in a continuous line, pneumatic cylinders 4, or other power mechanism, being mounted upon the crane 5 for this purpose. At their inlet ends, the retorts are provided with hoppers 6 which discharge into receiving chambers C. The floor of the upper retort, as shown in Figs. 2 and 11, projects into the receiving chamber C, forming what may be termed a feeding bridge 8. Above the bridge 8 is a shield 9, and the ram 10 operated by the cylinder 4 enters the space between the bridge 8 and shield 9 and acts upon the conveyer tiles 1 to force them endwise through the retort. When the retorts are arranged in vertical tiers,—as shown in Fig. 2—the bridge 8 is arranged as described, for the purpose of leaving space for the coal to fall through to the lower conveyer. The outer end of the lower conveyer is protected by a shield 11 projecting inwardly from the outer wall of the receiving chamber, and the ram 12 operated by the cylinder 13 is provided with a head 14 cut away at its outer end to form a recess 15 in which the conveyer elements 1 are received and forced through the lower retort, the shoulder 17 acting to transmit pressure to the conveyer.

That part of the mechanism relating to the upper retorts, as described in the preceding paragraph, is shown in plan in Fig 6, which is a section taken just below the shield 9. It will be understood that mechanism similar to that above described in connection with the upper retort, namely, cylinder 4, ram 10, bridge 8 and shield 9, is located at the right-hand end of the retort A which is partially shown in Fig. 6, and at the left-hand of retort B, as illustrated in that view. This mechanism serves to force the conveyer elements in a continuous line through the retorts A and B in opposite directions. In order to complete the movement of the conveyer elements in a continuous circuit through the two retorts A and B, means are provided for moving said elements transversely from one retort to the other. This transverse movement is effected through the conveyer passage 18 extending through the wall which separates the discharge and receiving chambers at the ends of the retorts. In order to remove the coke from the conveyer elements before effecting the transverse movement, I extend the conveyer rails 2 beyond the stationary floor of the retort to a bridge 20 which spans the discharge chamber and is spaced away from the stationary floor of the retort. The roof of the retort is carried downwardly into the discharge chamber to form a scraper 21 just above the bridge 20, although it is obvious that this scraper may be otherwise constructed. Upon reference to Fig. 2, it will be apparent that pressure communicated by the ram 10 to the row of conveyer elements 1 will force these elements through the retort in a continuous line. The ram 10, however, is utilized only for forcing the conveyer elements until the end one reaches the end of the stationary floor of the retort at the discharge chamber D. At this point, it is desirable to separate the end conveyer element from the others and move it individually across the discharge chamber to the space between the bridge 20 and the scraper 21. In so doing, the material is scraped from the conveyer element and permitted to fall through the discharge chamber upon the conveyer 22 in the quenching pit 23. This individual movement of the conveyer elements is effected by means of the mechanism actuated by the cylinder 4′ shown in Fig. 6 of the drawings. The specific embodiment of the invention there illustrated comprises a plunger rod 24 secured to the plunger operating in the cylinder 5. To the outer end of the plunger rod 24 is secured a cross head 25 carrying gripper arms 26 which extend through apertures in the wall of the receiving chamber. The gripper arms 26—as shown in detail in Fig. 8—are provided with heads 27, the inner faces of which are inclined as shown at 28. The gripper arms 26 have a normal tension toward each other, and when thrust inwardly by the action of the plunger bar 24, the inclines 28, riding against the end tile, cause the arms to spread until the abrupt shoulders 29 at the bases of the heads 27 pass the shoulders 30 on the tile 1. As illustrated, each tile 1 is formed with a rectangular recess at each corner, thus forming the shoulders 30 and spaces into which the heads 27 of the gripper arms may spring. As soon as the gripper arms have assumed the position shown in Fig. 6, the valves controlling the pneumatic or hydraulic mechanism are properly set to draw the plunger rod 24 away from the receiving chamber, thus drawing the end tile 1 outward to a position over the bridge 20 and opposite the conveyer passage 18. This movement not only properly positions the tile for its movement through the conveyer passage, but also, by the coaction of the scraper 21, shown in Fig. 2, effectually removes all of the coke therefrom. A cylinder 31 at each end of the pair of retorts is provided with a plunger 32 which passes through an aperture in the side wall of the receiving chamber opposite the bridge 20. As shown in Fig. 7, a single cylinder 31 may be equipped with two plungers 32 adapted to act simultaneously upon conveyer elements in the upper and lower pair of retorts. As soon as the conveyer tile 1 is positioned over the bridge 20, the plunger 32 is moved outward by the operator, thus forcing the tile 1 through the passage 18, shown in Fig. 6, to the receiving chamber of the other retort of the related pair. Upon passing through the passage 18, the tile 1 is received in the space between the shield 9, shown in Fig. 11, and the feeding bridge 8, the remainder of the tiles in retort B having been moved sufficiently by the plunger 10 to afford space for the extrance of the tile entering through the passage 18. Thereupon, the row of tiles in the retort B is moved to the right, as indicated by the arrow in Fig. 6, by means of the plunger 10, and the end tile at the right in retort B is seized by gripping apparatus similar to that shown at the left of retort A in Fig. 6 and moved between the bridge 20, at the right of the retort B, and the coacting scraper, after which said tile is moved transversely to the retort A in the manner above described.

The mechanism above described constitutes a continuous conveyer acting in a circuit through two retorts, and provides means for feeding coal to the conveyer at one end of each retort and stripping the coke therefrom at the opposite end. As will be readily understood, the two retorts, constituting a horizontal pair, are oppositely arranged, the material moving through them in opposite directions and the feed end of any one of the retorts being adjacent the discharge end of the other retort. In Fig. 4, the receiving chambers are lettered C and the discharge chambers D, this view showing the conveyer mechanism for one of the lower pairs of retorts.

The conveyer mechanism for the lower pairs of retorts is similar to that above described in connection with the upper retorts, except that at the feeding end the conveyer elements, after being moved transversely through the conveyer passages 8, are received in the recess 15 at the end of the plunger head 14 and beneath the stationary shield 11 which projects inwardly from the outer wall of the receiving chamber. The material fed to the hopper 6 shown in Fig. 11 falls through the space between the bridge 8 and the outer wall of the receiving chamber upon the shield 11, whence it spreads inwardly upon the conveyer elements 1 of the lower series. The controlling means for the plunger actuating mechanism is preferably located in a compartment 35 located upon the crane 5, as shown in Fig. 1. When the actuating power is compressed air, or when hydraulic mechanism is employed, the control of the conveyers may be effectuated by valves under the control of an operator in the house 35, as may also the movement of the crane from one retort to another by proper motor mechanism. Hoppers 36 upon the crane may receive the coal from any suitably arranged delivery apparatus and transmit it to the hoppers 6 of the retorts.

In connection with the conveyer mechanism illustrated, I have shown means for carrying out an improved coking process devised by me, in which gases distilled from material at a comparatively low temperature are conducted through highly heated coke, the purpose of this operation being to form a coherent coke from coals which do not yield such a coke under ordinary treatment. I have found in practice that the gases distilled at a comparatively low temperature, and rich in carbon, upon being passed through highly heated coke near the discharge end of the retort, are dissociated, and that the liberated carbon deposited upon and in the highly heated coke forms a cementing agent which results in the formation of a tough and coherent product. The retorts illustrated in the drawings are heated by means of a furnace 36, the products of combustion from which are conducted through ducts 37 above the retorts and ducts 38 between the upper and lower retorts. During the passage of the material through the retorts from end to end, heat is absorbed from the gases in the ducts 37 and 38 and the material near the discharge ends of the retorts, owing to the more prolonged action of the heated retort thereon, is at a higher temperature than the material at the charging end. The material in the hoppers at the charging ends of the retorts serves to effectually seal the inlets, and the discharge chambers are sealed either by a water seal or in any suitable manner, thus preventing entrance of atmospheric oxygen into the retorts, and also preventing escape of the distilled gases, except in the manner about to be described.

The roofs of the lower retorts near their discharge ends are provided with openings 39, shown in Fig. 2 and in detail in Fig. 9. These openings register with openings 40 in the stationary floors of the upper retorts, thereby communicating with the space beneath the conveyer elements 1, which elements are spaced from the stationary floor by the conveyer rails 2. The conveyer elements, as shown in Fig. 10, are provided with apertures, as illustrated, taking the form of notches 41 in their edges and angular recesses at their corners, and through these apertures the gases distilled in the lower oven pass upward through the highly heated coke at the discharge end of the upper oven. Referring to Fig. 2, it will be apparent that the gases distilled at the right-hand, or low temperature end of the lower oven, have no means of escape except by passing forward in the direction of the arrows to the openings 39, and thence upward through the highly heated coke in the upper retort, from which they escape through the outlet pipe 42 to the atmosphere, or to such treating or storing apparatus as may be used.

One of the difficulties incident to the formation of coke in a horizontal oven heated from an arch above the coke arises from the fact that the shrinkage of the material as the coking process progresses results in drawing the coke away from the source of heat at the top of the retort, thereby leaving a space which interferes with the effective transmission of heat from the arch to the coke. If the gases be drawn off through the roof of the retort the direction of movement of the gases, being upward, is adverse to the transmission of heat to the coke by conduction through the gases as a medium, and, further, the gases are conducted away from the retort without imparting their own heat to the contents of the retort. On the other hand, a still body of gas above the coke does not form an efficient agent for the transmission of heat downward from the arch. In the operation of my improved oven, however, these difficulties are largely overcome. In the form of oven illustrated, the gases distilled at the charging ends, C, of the lower ovens pass upward through the highly heated coke at the discharge ends of the upper ovens and the heat formed by the dissociation of the hydrocarbon contained in the gases is imparted to the coke at the discharge ends of the upper ovens, thereby intensifying the temperature at that point.

I would have it understood that I do not limit my invention to the precise construction and arrangement of parts shown in the drawings and herein described, as various modifications or alterations may be made without departing from my original invention, and my improved continuous conveyer may be used for other purposes, as, for instance, in a boiler furnace or other fire-box.

I claim:

1. In a coking furnace, a plurality of retorts, a conveyer floor in said retorts, and means for moving said floor in a continuous path through said retorts.

2. In a coking furnace, two retorts, a conveyer floor in said retorts, said floor comprising separate elements, means for moving said elements through said retorts, and from one retort to the other in a continuous path.

3. In a device of the class described, a plurality of retorts, a conveyer in said retorts comprising separate elements, means for moving said elements collectively through each of said retorts, and means for separating part of said elements in one retort from the remainder and moving said separated elements to another of said retorts.

4. In a coking furnace, two retorts arranged side by side, a conveyer floor in said retorts, said floor comprising separate elements, means for moving said elements in opposite directions through said retorts, and means at the ends of said retorts for moving said elements from one retort to the other.

5. In a coking furnace, two retorts arranged side by side, passages between said retorts adjacent their ends, a conveyer floor in said retorts, said floor comprising separate elements, means for moving said elements in opposite directions through said retorts, and means for moving said elements from one retort to the other through said passages.

6. In a coking furnace, two retorts arranged side by side, a conveyer floor in said retorts, said conveyer floor comprising separate elements, a feeding chamber and a discharge chamber at each end of said furnace opposite the ends of said retorts, said chambers at each end of the furnace being provided with a connecting passage, discharge bridges extending across said discharge chambers, feeding bridges extending across said feeding chambers, means for moving said conveyer elements endwise of said retorts, and means for moving said elements through said passages from said discharge to said feeding chambers.

7. In a coking furnace, two retorts arranged side by side, a conveyer floor in said retorts, said conveyer floor comprising separate elements, a feeding chamber and a discharge chamber at each end of said furnace opposite the ends of said retorts, said chambers at each end of the furnace being provided with a connecting passage, discharge bridges extending across said discharge chambers, scrapers above said discharge bridges, feeding bridges extending across said feeding chambers, means for moving said conveyer elements endwise of said retorts, and means for moving said elements through said passages from said discharge to said feeding chambers.

8. In a coking furnace, two retorts arranged side by side, a conveyer floor in said retorts, said conveyer floor comprising separate elements, a feeding chamber and a discharge chamber at each end of said furnace opposite the ends of said retorts, said chambers at each end of the furnace being provided with a connecting passage, discharge bridges across said discharge chambers, feeding bridges extending across said feeding chamber, supports for said conveyer elements extending from the ends of said retorts to said discharge bridges, means for moving said conveyer elements endwise of said retorts, and means for moving said elements through said passages from said discharge to said feeding chambers.

9. In a coking furnace, two retorts arranged side by side, a series of tiles forming a conveyer floor in said retorts, said retorts being connected by passages adjacent their ends, and power actuated plungers for moving said tiles in opposite directions through said retorts and for moving said tiles through said passages from one retort to the other.

10. In a coking furnace, two retorts arranged side by side, a stationary floor and a conveyer floor in each of said retorts, said conveyer floor comprising separate elements, a discharge chamber at one end of each retort, said discharge chambers being at opposite ends of said retorts, each discharge chamber communicating with the receiving end of the other retort through a conveyer passage, a bridge extending across each discharge chamber and spaced from the stationary floor of the retorts, a support for said conveyer elements, said support being of open structure to permit discharge of material therethrough, means for moving said conveyer elements in a continuous line through said retorts, means for moving a single element from the stationary floor of each of said retorts to one of said bridges, and means for moving said elements through said passages.

11. In a coking furnace, two retorts arranged side by side, a stationary floor and a conveyer floor in each of said retorts, said conveyer floor comprising separate elements, a discharge chamber at one end of each retort, said discharge chambers being at opposite ends of said retorts, each discharge chamber communicating with the receiving end of the other retort through a conveyer passage, a bridge extending across each discharge chamber and spaced from the stationary floor of the retort, a scraper above each of said bridges, a support for said conveyer elements, said support being of open structure to permit discharge of material therethrough, means for moving said conveyer elements in a continuous line through said retorts, means for moving a single element from the stationary floor of each of said retorts to one of said bridges, and means for moving said elements through said passages.

12. In a coking furnace, a retort, a series of tiles forming a conveyer floor in said retort, means for moving said tiles in a continuous line through said retort, and means for gripping the end tile and drawing it away from the remainder of the series.

13. In a coking furnace, a retort having grooves at the bases of its side walls, a series of tiles projecting into said grooves, means for pushing said tiles through said retort, and means for gripping the end tile and drawing it away from the others of the series.

14. In a coking furnace, a retort having grooves at the bases of its side walls, guide rails in said grooves, a series of disconnected conveyer tiles projecting into said grooves and resting on said rails, and means for moving said tiles.

15. In a coking furnace, a retort, a series of tiles forming a conveyer floor in said retort, said tiles being provided with shoulders, a power actuated plunger for pushing said tiles through said retort, a second power actuated plunger, and a gripper secured to said second plunger and adapted to coöperate with the shoulders on said tiles to draw the end one away from the remainder of the series.

16. In a coking furnace, two retorts arranged side by side, a stationary floor and a conveyer floor in each of said retorts, said conveyer floor comprising separate elements, a discharge chamber at one end of each retort, said discharge chambers being at opposite ends of said retorts, a receiving chamber at the end of each retort opposite its discharge chamber, a bridge extending across each discharge chamber and spaced from the stationary floor of the retort, a support for said conveyer elements, said support being of open-structure to permit discharge of material therethrough, a receiving bridge projecting from the stationary floor of each retort into its receiving chamber, each receiving chamber communicating with the adjacent discharge chamber through a conveyer passage just above the bridges therein, means for moving said conveyer elements in a continuous line in said retorts, means for moving a single element from the stationary floor of each of said retorts to the adjacent discharge chamber bridge, and means for moving said element from the discharge chamber bridge through the coacting passage to the adjacent receiving chamber bridge.

17. In a coking furnace, retorts arranged in vertical and horizontal pairs, each vertical pair having a common receiving chamber at one end and a common discharge chamber at the opposite end, the receiving and discharge chambers of adjacent vertical pairs being oppositely disposed, each discharge chamber communicating with the adjacent receiving chamber through passages adjacent the ends of the retorts, a conveyer for each horizontal pair of retorts, and means for moving said conveyers in a circuit through said retorts and passages.

18. In a coking furnace, a pair of retorts arranged one above the other, a common discharge chamber at one end of said retorts and a common receiving chamber at the other end, a bridge projecting from the floor of the upper retort part way across said receiving chamber, a shield above said bridge, a conveyer comprising separate elements, and means for moving each element transversely into the space between said bridge and shield and for moving said elements endwise of said upper retort.

19. In a coking furnace, a pair of retorts arranged one above the other, a common discharge chamber at one end of said retorts and a common receiving chamber at the other end, a bridge projecting from the floor of the upper retort part way across said reciving chamber, a shield above said bridge, a conveyer comprising separate elements, means for moving each element transversely into the space between said bridge and shield and for moving said elements endwise of said upper retort, a shield projecting inwardly from the outer wall of said receiving chamber part way to said lower retort, a plunger operating beneath said shield and spaced away therefrom at its inner end, a second conveyer comprising separate elements, means for moving said elements transversely into the space between said plunger and bridge, and means for actuating said plunger to move said elements endwise of said lower retort.

20. In a device of the class described, a series of retorts, a crane spanning said retorts and movable from one to another, conveyers in said retorts, and means mounted on said crane for actuating said conveyers.

21. In a device of the class described, a series of retorts, a movable conveyer floor in each retort, a crane movable from one retort to another, and power mechanism mounted on said crane for actuating said conveyer floors.

22. In a device of the class described, a series of retorts, a conveyer in each retort comprising a series of separate elements, a crane movable from one retort to another, and means upon said crane for moving said elements collectively through said retorts and for separating part of said elements from the remaining elements.

23. In a device of the class described, a series of retorts arranged side by side, conveyers in said retorts comprising a series of separate elements, a crane movable from one retort to another, means upon said crane for moving said elements endwise through said retorts, and means for moving said elements transversely from one retort to another.

24. In a device of the class described, a series of retorts arranged side by side, conveyers in said retorts comprising a series of separate elements, a crane movable from one retort to another, means upon said crane for collectively moving said elements endwise through said retorts and for separating part of said elements from the remainder thereof, and means for moving said elements transversely from one retort to another.

25. In a device of the class described, a series of retorts, conveyers in said retorts, a crane movable from one retort to another, conveyers in said retorts, and fluid pressure cylinders and plungers and controlling mechanism therefor mounted on said crane and operatively related to said conveyers.

26. In a device of the class described, a series of retorts, conveyers in said retorts, hoppers at the charging ends of said retorts, a traveling crane, and hoppers and actuating mechanism for said conveyers mounted on said crane.

27. In a device of the class described, a series of retorts, said retorts being arranged in pairs vertically and horizontally, connecting conveyer passages between the retorts of each horizontal pair, common charging and common discharging chambers for each vertical pair of retorts, conveyers comprising separate elements, means for moving said elements collectively endwise of said retorts, means for separating part of said elements from the remainder, and means for moving the separated elements through said conveyer passages.

28. In a coking furnace, two retorts, means for feeding material therethrough from end to end, means for heating said retorts, said retorts being sealed at their ends and connected by passages adjacent their discharge ends, and one of said retorts having an outlet adjacent its discharge end, thereby permitting gases distilled from the material in one of said retorts to pass through the material in the other retort.

29. In a coking furnace, two retorts, one above the other, means for feeding material therethrough from end to end, means for heating said retorts, said retorts being sealed at their ends and connected by passages adjacent their discharge ends, and the upper retort having an outlet adjacent its discharge end, thereby permitting gases distilled from the material in one of said retorts to pass through the material in the other retort.

30. In a device of the class described, two retorts, means for feeding material therethrough from end to end, means for heating said retorts, said retorts being sealed at their ends, and means for compelling gases distilled adjacent the charging end of one retort to pass through the material adjacent the discharge end of the other retort.

In testimony whereof, I have subscribed my name.

LELAND L. SUMMERS.

Witnesses:
ANNA L. WALTON,
WALTER A. SCOTT.